(12) United States Patent
Nussbaum et al.

(10) Patent No.: US 6,779,154 B1
(45) Date of Patent: Aug. 17, 2004

(54) ARRANGEMENT FOR REVERSIBLY CONVERTING EXTENSIBLE MARKUP LANGUAGE DOCUMENTS TO HYPERTEXT MARKUP LANGUAGE DOCUMENTS

(75) Inventors: Paul Alton Nussbaum, Midlothian, VA (US); William Bateman Willaford, IV, Glen Allen, VA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/495,124

(22) Filed: Feb. 1, 2000

(51) Int. Cl.[7] .............................................. G06F 17/30
(52) U.S. Cl. ...................................... 715/523; 715/513
(58) Field of Search ................................ 715/513, 522, 715/523

(56) References Cited

U.S. PATENT DOCUMENTS

| | | | |
|---|---|---|---|
| 6,336,124 B1 * | 1/2002 | Alam et al. | 715/523 |
| 6,565,609 B1 * | 5/2003 | Sorge et al. | 715/503 |
| 6,585,777 B1 * | 7/2003 | Ramaley et al. | 715/513 |

OTHER PUBLICATIONS

Tim Bray, Flipping the Links, Sep. 12, 1998.*
"XHTML™ 1.0: The Extensible HyperText Markup Language A Reformation of HTML 4 in XML 1.0", W3C Recommendation (Jan. 26, 2000).
"XML Linking Language (XLink)", W3C Working Draft (Jan. 19, 2000).

* cited by examiner

*Primary Examiner*—Stephen S. Hong
*Assistant Examiner*—Gregory J. Vaughn
(74) *Attorney, Agent, or Firm*—Leon R. Turkevich

(57) ABSTRACT

An application server executes voice-enabled web applications by runtime execution of extensible markup language (XML) documents that define the voice-enabled web application to be executed. The application server includes a hypertext markup language (HTML) conversion module configured for translating information present during runtime execution of an XML document into an HTML document. The system converts the XML document into an HTML document in a manner that is reversible, where all the information from the original XML document is preserved such that the HTML document can be converted back to the original XML document. In addition, the system supplies HTML-compliant formatting information to specifically identify formatting specifications for XML tags having implied formatting characteristics during runtime execution of the XML document. Moreover, the system generates HTML-compliant reference tags for each XML tag that refers to another XML object, based on the context of the XML tag during the runtime execution of the XML document. Hence, the generated HTML document includes all information used during runtime execution of the XML document, enabling the use of web analysis tools to analyze XML-defined applications by analyzing the HTML document for the structure of the XML document relative to other XML documents used to define the XML-defined application.

27 Claims, 4 Drawing Sheets

```
<XML Version = "1.0">
 ╭104a
 <DOCUMENT>╱─104b

<OPTIONS name = "1"    value = "new_msg" >
 <OPTIONS name = "2"    value = "leave_msg.xml" >
 <OPTIONS name = "9"    value = "AUDIO: help" >

</DOCUMENT>
```

FIG. 4A

```
<HTML>
<HEAD>
<TITLE> XML Document Title </TITLE>
</HEAD>
<BODY>
    <!-- Begin XML Document Conversion -->
< XML Version = "1.0" >
< DOCUMENT >.
    < OPTIONS name = "1"    value = "
        <a href = "context_lib/library.htm"> new_msg </a> "
    < OPTIONS name = "2"    value = "
        <a href = "context_runtime/leave_msg.htm">leave_msg.xml </a> "
    < OPTIONS name = "g"    value = "
        <a href = "context_runtime/help.wav"> AUDIO: help </a> "
< /DOCUMENT >
</BODY>
</HTML>
```

FIG. 4B

ARRANGEMENT FOR REVERSIBLY CONVERTING EXTENSIBLE MARKUP LANGUAGE DOCUMENTS TO HYPERTEXT MARKUP LANGUAGE DOCUMENTS

BACKGROUND OF THE INVENTION

1. Field of the Invention

The present invention relates to generation of extensible markup language (XML) documents for development of voice enabled web applications within a hypertext markup language (HTML) and hypertext transport protocol (HTTP) framework.

2. Description of the Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

An open standards-based Internet protocol (IP) network, such as the World Wide Web, the Internet, or a corporate intranet, provides client-server type application services for clients by enabling the clients to request application services from remote servers using standardized protocols, for example hypertext transport protocol (HTTP). The web server application environment can include web server software, such as Apache, implemented on a computer system attached to the IP network. Web-based applications are composed of HTML pages, logic, and database functions. In addition, the web server may provide logging and monitoring capabilities.

In contrast to the public switched telephone network, the open standards-based IP network has enabled the proliferation of web based applications written by web application developers using ever increasing web development tools. Hence, the ever increasing popularity of web applications and web development tools provides substantial resources for application developers to develop robust web applications in a relatively short time and an economical manner. However, one important distinction between telephony-based applications and web-based applications is that telephony-based applications are state aware, whereas web-based applications are stateless.

In particular, telephony applications are state aware to ensure that prescribed operations between the telephony application servers and the user telephony devices occur in a prescribed sequence. For example, operations such as call processing operations, voicemail operations, call forwarding, etc., require that specific actions occur in a specific sequence to enable the multiple components of the public switched telephone network to complete the prescribed operations.

The web-based applications running in the IP network, however, are state-less and transient in nature, and do not maintain application state because application state requires an interactive communication between the browser and back-end database servers accessed by the browsers via a HTTP-based web server. However, an HTTP server provides asynchronous execution of HTML applications, where the web applications in response to reception of a specific request in the form of a URL from a client, instantiate a program configured for execution of the specific request, send an HTML web page back to the client, and terminate the program instance that executed the specific request. Storage of application state information in the form of a "cookie" is not practical because some users prefer not to enable cookies on their browser, and because the passing of a large amount of state information as would normally be required for voice-type applications between the browser and the web application would substantially reduce the bandwidth available for the client.

Commonly-assigned, copending application Ser. No. 09/480,485, filed Jan. 11, 2000, entitled Application Server Configured for Dynamically Generating Web Pages for Voice Enabled Web Applications the disclosure of which is incorporated in its entirety herein by reference, discloses an application server that executes a voice-enabled web application by runtime execution of extensible markup language (XML) documents that define the voice-enabled web application to be executed. The application server includes a runtime environment that establishes an efficient, high-speed connection to a web server. The application server, in response to receiving a user request from a user, accesses a selected XML page that defines at least a part of the voice application to be executed for the user. The XML page may describe any one of a user interface such as dynamic generation of a menu of options or a prompt for a password, an application logic operation, or a function capability such as generating a function call to an external resource. The application server then parses the XML page, and executes the operation described by the XML page, for example dynamically generating an HTML page having voice application control content, or fetching another XML page to continue application processing. In addition, the application server may access an XML page that stores application state information, enabling the application server to be state-aware relative to the user interaction. Hence, the XML page, which can be written using a conventional editor or word processor, defines the application to be executed by the application server within the runtime environment, enabling voice enabled web applications to be generated and executed without the necessity of programming language environments.

Hence, web programmers can write voice-enabled web applications, using the teachings of the above-incorporated application Ser. No. 09/480,485, by writing XML pages that specify respective voice application operations to be performed. The XML documents have a distinct feature of having tags that allow a web browser (or other software) to identify information as being a specific kind or type of information. Unlike hypertext markup language (HTML) documents, however, XML documents lack universal resource locators (URLs) that allow a web browser (or other software) to link from document to document; rather, the location of referenced XML documents needs to be determined by an application server during runtime execution. Although there is a proposal with the World Wide Web Consortium entitled "Xlink" for an XML Linking Language, located on the Internet at "http://www.w3.org/TR/xlink/", this proposal has yet to be ratified.

Hence, XML documents currently lack the capability of specifying URLs as found in HTML documents.

Consequently, analysis of XML documents during application development is limited to analysis within the runtime environment during execution of the XML documents, since application-specific information used by the application server within the runtime environment is not explicitly specified in the XML documents. Hence, applications defined by XML documents currently cannot be analyzed outside the application runtime environment using existing web development tools configured for analysis according to HTML protocol.

SUMMARY OF THE INVENTION

There is a need for an arrangement that enables an XML document to be analyzed independent of execution in its native XML runtime environment, while maintaining XML-based content information and linking information determined during execution in the native runtime environment. In particular, there is a need for an arrangement that enables the content information and linking information for an XML document during runtime execution to be preserved for analysis using web development tools.

There is also a need for an arrangement that enables an application defined by runtime execution of a plurality of XML documents to be analyzed using web-master oriented web site management tools that rely on HTML-based URLs for linking information.

These and other needs are attained by the present invention, where a system is configured for translating information present during runtime execution of an extensible markup language (XML) document into a hypertext markup language (HTML) document. The system converts the XML document into an HTML document in a manner that is reversible, where all the information from the original XML document is preserved such that the HTML document can be converted back to the original XML document. In addition, the system supplies HTML-compliant formatting information to specifically identify formatting specifications for XML tags having implied formatting characteristics during runtime execution of the XML document. Moreover, the system generates HTML-compliant reference tags for each XML tag that refers to another XML object, based on the context of the XML tag during the runtime execution of the XML document. Hence, the generated HTML document includes all information used during runtime execution of the XML document, enabling the use of web analysis tools to analyze XML-defined applications by analyzing the HTML document for the structure of the XML document relative to other XML documents used to define the XML-defined application.

According to one aspect of the present invention, a method is provided in an executable system for generating a new hypertext markup language (HTML) document representing an extensible markup language (XML) document. The method includes copying into the new HTML document text from the XML document, and resolving shared symbols of XML tags from within the text in the new HTML document. The method also includes first inserting into the HTML document HTML-compliant formatting information for selected XML objects within the text of the HTML document based on formatting characteristics determined during runtime execution of the XML document, and second inserting into the HTML document an HTML-compliant reference tag for each corresponding XML reference object in the text within the HTML document based on context information determined during runtime execution of the XML document. The resolving of shared symbols ensures that the XML tags illustrated as text within the HTML document cannot interfere with the HTML tags. Moreover, the insertion of the HTML-compliant formatting information and the HTML-compliant reference tag ensures that information implicit within the XML document during execution of the XML document within an application runtime environment is explicitly specified within the HTML document. Hence, the HTML document includes all information necessary to accurately describe the XML document, enabling the use of web-based application development tools to analyze the XML document relative to other XML documents used to define an application.

Another aspect of the present invention provides a system configured for executing an application defined by XML documents. The system includes a storage medium for storing the XML documents, and an application server configured for executing the XML documents in an application runtime environment. The application server includes a conversion module configured for generating a new hypertext markup language (HTML) document representing a corresponding one of the XML documents. The conversion module generates the new HTML document by copying text from the one XML document into the new HTML document, adding to the HTML document formatting information for selected XML objects within the one XML document and parsed by the application server within the application runtime environment, and adding to the HTML document an HTML-compliant reference tag for each XML object referenced by the one XML document according to the application runtime environment.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIGS. 4A and 4B are diagrams summarizing the conversion of XML tags to HTML-compliant tags according to the method of FIG. 3.

BEST MODE FOR CARRYING OUT THE INVENTION

The disclosed embodiment is directed to an arrangement for defining an executable voice application using extensible markup language (XML) documents that specify user interface operations, logic operations, and/or function operations. The XML documents are generated using prescribed rule sets that specify executable functions performed by an application runtime environment in an application server. Hence, the application server is able to provide unified voice messaging services and data services via an IP network by executing stored XML documents for voice enabled web applications. In addition to specifying an application operation (e.g., user interface operation, a logical operation, or a procedure call), a stored XML document may also specify an application state for a user session. Hence the application server is able to efficiently execute voice web applications merely by parsing selected XML documents and implementing XML tags that are specified within the selected XML documents. The use of XML documents in defining executable voice applications thus provides a structured application tool that enables a user to easily customize a voice application by making relatively minor changes to the XML documents.

According to the disclosed embodiment, the ability to convert XML documents to HTML document as described herein enables application developers to utilize the wealth of web application development tools developed for conventional HTML-based web applications. Hence, web-based applications can be defined by XML documents, where application developers can take advantage of the flexibility of XML, while at the same time utilizing commercially-available web site management tools, even if the web site management tools rely on HTML-type URLs and lack "Xlink" functionality.

Figure 1:
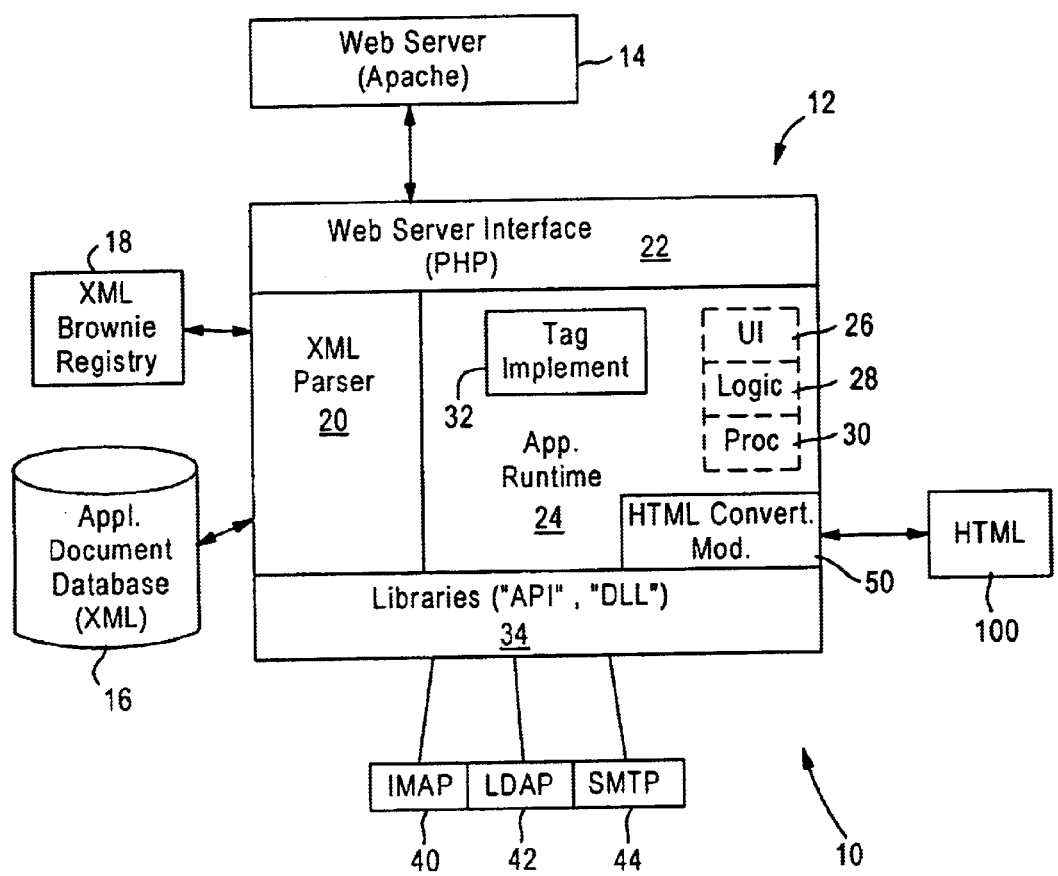
FIG. 1 is a diagram illustrating in detail an application server configured for executing applications defined by XML documents and generating HTML document representing the XML documents according to an embodiment of the present invention.

FIG. 1 is a block diagram illustrating a system configured for executing applications defined by XML documents, and converting the XML documents to HTML documents for analysis by web development tools according to an embodiment of the present invention. The system 10 includes an application server 12, a Web server 14, an XML document database 16 for storing the XML documents that define the applications, and an XML document registry 18 configured for storing XML documents that specify application state information for respective user sessions. The web server 14, for example an Apache server, receives HTTP requests from clients via the Internet and forwards to the clients HTML-based web pages dynamically generated by the application server 12. In particular, the application server 12 is configured for executing applications defined by stored XML documents, also referred to generally as a web applications, in response to the HTML requests from the client. The application server 12 is implemented as a server executing a PHP hypertext processor with XML parsing and processing capabilities, available open source at http://www.php.net.

Four types of XML documents are used by the application server 12 to execute web applications: menu documents, activity documents, decision documents, and "brownies". The menu documents, activity documents, and decision documents are XML documents, stored in the document database 16, that define user interface and boolean-type application logic for a web application, hence are considered "executable" by the application server 12. The brownie document, stored in the registry 18, is an XML data record used to specify application state and user attribute information for a given XML application during a user session.

Hence, the XML documents define user interface logistics and tie services and application server events together in a meaningful way, forming a coherent application or sets of applications.

As shown in FIG. 1, the application server 12 includes an XML parser 20 configured for parsing the application-defining XML documents stored in the XML document database 16, or the XML documents (i.e., "brownies") stored in the registry 18 and configured for specifying the state and attributes for respective user sessions. The application server 12 also includes a high speed interface 22 that establishes a high-speed connection between the application server 12 and the web server 14. For example, the PHP (hypertext preprocessor) includes a high-speed interface for Apache Web servers.

The application server 12 also includes a runtime environment 24 for execution of the parsed XML documents. The runtime environment 24 may selectively execute any one of a user interface operation 26, a logic operation 28, or a procedure call 30 as specified by the parsed XML document by executing a corresponding set of executable functions based on the rule set for the corresponding operation. In particular, the application runtime environment 24 includes a tag implementation module 32 that implements the XML tags parsed by the XML parser 20. The tag implementation module 32 performs relatively low-level operations, for example dynamically generating an XML menu page using executable functions specified by a menu rule set in response to detecting a menu tag, performing a logical operation using executable functions specified by a logic rule set in response to a decision tag, or fetching an audio (.wav) file in response to detecting a sound tag. Hence, the tag implementation module 32 implements the tag operations that are specified within the XML framework of the stored XML documents.

The application server 12 also includes a set of libraries 34 that may be implemented as dynamically linked libraries (DLLs) or application programming interface (API) libraries. The libraries 34 enable the runtime environment 24 to implement the procedures 30 as specified by the appropriate XML document. For example, the application server 12 may issue a function call to one of a plurality of IP protocol compliant remote resources 40, 42, or 44 according to IMAP protocol, LDAP Protocol, or SMTP protocol, respectively. For example, the PHP hypertext processor includes executable routines capable of accessing the IMAP or LDAP services.

The application server 12 also includes a set of libraries 34 that may be implemented as dynamically linked libraries (DLLs) or application programming interface (API) libraries. The libraries 34 enable the runtime environment 24 to implement the procedures 30 as specified by the appropriate XML document. For example, the application server 12 may issue a function call to one of a plurality of IP protocol compliant remote resources 40, 42, or 44 according to Internet Message Access Protocol (IMAP), Lightweight Directory Access Protocol LDAP) or Simple Mail Transfer Protocol (SMTP), respectively. For example, the PHP hypertext processor includes executable routines capable of accessing the IMAP or LDAP services.

Figure 2:
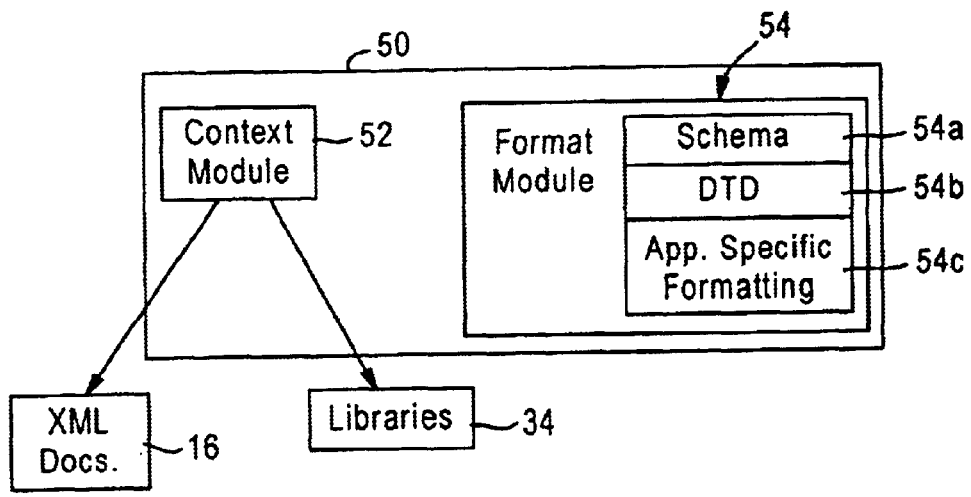
FIG. 2 is a diagram illustrating the application server of FIG. 1 in further detail.

FIG. 2 is a diagram illustrating in further detail the HTML conversion module 50. The conversion module 50 includes a context module 52, and a format module 54. The format module 54 has a first portion 54a, a second portion 54b, and a third portion 54c. The first portion 54a is configured for generating an HTML format tag based on a schema definition within an XML tag; the second portion Document Type Definition (DTD) 54b is configured for generating an HTML format tag based on document type descriptors specified within the XML tag; and the third portion 54c is configured for generating an HTML format tag based on application-specific formatting requirements identified by the application runtime environment 24 during execution of the XML tag. For example, a naming convention may be established within the application runtime environment 24 such that a tag is defined within the application runtime environment 24 to have a prescribed formatting requirement, such that a tag "audio:" specifies an audio file that corresponds to a .wav MIME type or "menu_box:" corresponds to a table heading prescribed attributes for generation of a menu display for a user.

The context module 52 is configured for generating linking information within the application runtime environment 24 for an XML object referenced within a given XML page. In particular, the context module 52 gathers transient context information used during execution of the XML document by the application runtime environment 24, and generates a universal resource locator (URL) that explicitly specifies the location information for a referenced XML object based on the corresponding transient context information. For example, the context module 52 may generate a URL that specifies the location for another XML document stored within the application document database 16: in this case, the URL would actually specify another HTML document that represents the referenced XML document. As another example, an XML object may specify a function call to an identified procedure within the libraries 34: in this case, the URL would actually specify another HTML document that represents the presence of the libraries 34 and having a list of all available procedures, for example indicating the existence of the procedure calls for accessing the services 40, 42 or 44.

Figure 3:
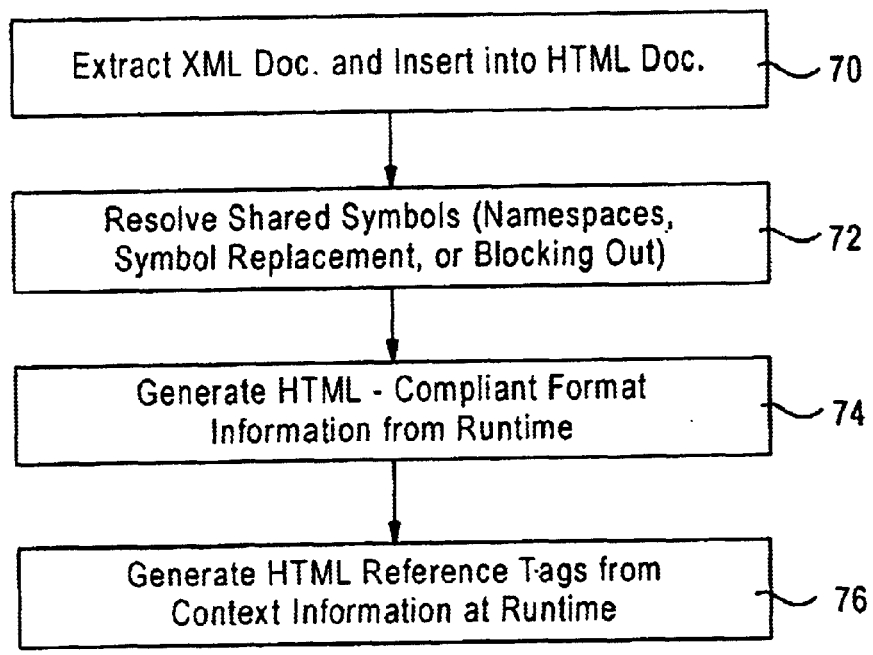
FIG. 3 is a flow diagram illustrating the method of generating a new HTML document representing an XML document by the application server of FIG. 1 according to an embodiment of the present invention.

FIG. 3 is a diagram illustrating the method by the HTML conversion module 50 of generating an HTML document representing an XML document according to an embodiment of the present invention. The steps described in FIG. 3 can be implemented as executable code that is stored on a computer readable medium (e.g., a hard disk drive, a floppy drive, a random access memory, a read only memory, an EPROM, a compact disk, etc). FIGS. 4A and 4B are diagrams illustrating an XML document 90 and the new HTML document 100 generated by the conversion module 50 that represents the XML document 90, respectively. FIGS. 4A and 4B illustrate representative tags that are present within the XML document 90 and the HTML document 100, and do not necessarily illustrate an XML document or an HTML document in its entirety. Rather, the XML document 90 and the HTML document 100 are used to illustrate the conversion process of FIG. 3 by the conversion module 50.

The method begins in step 70, where the HTML conversion module 50 extracts a selected XML document 90, for example an XML menu document that specifies prescribed operations to be performed in response to detecting the user key inputs "1", "2", or "9". The HTML conversion module 50 inserts the text of the selected XML document in its entirety into the new HTML page 100 according to HTML formatting rules. In particular, the HTML conversion module 50 generates the necessary HTML, header, and title tags, and adds the text of the XML page in its entirety within the body tags 102a, 102b.

The HTML conversion module 50 then resolves in step 72 the presence of any shared symbols 104a, 104b between the XML tags and the HTML tags. In particular, any XML symbols that are also shared in HTML need to be substituted to ensure that the XML tags are not erroneously parsed according to HTML protocol by a browser. Hence, the HTML conversion module 50 resolves the shared symbols by any one of three possible techniques, namely by generating distinctive namespace declarations for the XML tags having the shared symbols, replacing the shared symbols with uniquely identifiable replacement symbols, or adding HTML tags within the new HTML document 100 that block out the shared symbols. As shown in FIG. 4B, the shared symbols 104a ("<") and 104b (">") within the XML tags are replaced with replacement symbols 106a ("<") and 106b (">"), respectively. Alternately, the HTML conversion module 50 could effectively block out the XML tags by placing the shared symbols 104 of the XML tags within comment tags 108a, 108b such that the portions within the comment tags 108a, 108b are ignored by a browser. Alternately, the HTML conversion module 50 could generate distinctive namespace declarations for the XML tags that are distinctive from the HTML tags.

After resolving the shared symbols, the HTML conversion module 50 uses the format module 54 for generation of HTML-compliant formatting information in step 74. As described above, the format module 54 may generate HTML tags that specify format information based on XML tags that define a certain schema, a document type description, or based on application-specific formatting parameters that are generated during execution of the XML document by the application runtime environment 24. For example, the XML document 90 includes an XML tag 110 having an XML object "AUDIO:" 112. The XML object "AUDIO:" may specify to the application runtime environment 24 that the referenced element 114 ("help") is a stored audio file that is to be forwarded to a user for playback by the browser; hence, although the XML object "AUDIO:" implicitly describes that the referenced element 114 is an audio file, the format module 54 adds the formatting information 116 (".wav"), for example in the form of a Multipurpose Internet Mail Extension (MIME) media type, enabling a browser to recognize the stored file "help" as an audio file to be played by an audio plug-in.

The HTML conversion module 50 then uses the context module 52 to generate HTML reference tags 118a, 118b. 118c for each XML reference object 120a, 120b, 120c of the XML document 90 in step 76. For example, assume the XML reference object 120a references a procedure call "new_msg" for the application runtime environment 24 to check for new stored messages; the XML reference object 120b references another stored XML document "leave_msg.xml" executable by the application runtime environment 24 that enables a user to leave a message for another voicemail subscriber; the XML reference object 120c is an audio help file to be forwarded by the application runtime environment 24 to a user for playback by the browser.

The context module 52, upon recognizing that the XML reference object 120a references a procedure call, generates the reference tag 118a in the form of a URL that identifies an HTML document "library.htm" stored at a location "context$_{13}$ lib" that describes the existence of the libraries 34 and the supported procedures. As described above, the HTML document "library.htm" stored at location "context_lib" is not the actual libraries 34, the rather another HTML document that describes the existence of the libraries 34.

Upon generating the reference tag 118a, the context module 52 inserts the reference tag 118a within the XML reference object 120a, enabling a browser to display the XML reference object 120a within the HTML document 100 as a hyperlink to another HTML document. Similarly, the context module 52 inserts reference tags 118b and 118c for the XML reference objects 120b and 120c, respectively. In particular, the reference tag 118b specifies the location of the HTML document "leave_msg.htm" that describes the corresponding XML document 120b "leave_msg.xml"; the reference tag 118c, however, specifies the location of the actual audio help file, enabling the browser to play the audio help file in response to a user clicking on the corresponding XML reference object when displayed as a hyperlink.

According to the disclosed embodiment, XML documents can be analyzed using HTML-based web development tools by creating HTML documents that describe both the transient formatting information and context information that arise during runtime execution of the XML documents. The HTML documents preserve all of the original XML document information, enabling the HTML conversion module to reversibly recreate the original XML document from the HTML document. Hence, Web application development tools can be used to analyze the structure and the multiple states of applications defined by XML documents, for example to ensure that the application sequence is not logically have any orphans or dead ends within the state engine generated by the application during execution.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an executable system for generating a new hypertext markup language (HTML) document representing an extensible markup language (XML) document, the method comprising:

copying into the new HTML document text from the XML document;

resolving shared symbols of XML tags from within the text in the new HTML document;

first inserting into the HTML document HTML-compliant formatting information for selected XML objects within the text of the HTML document based on formatting characteristics determined during runtime execution of the XML document; and second inserting into the HTML document an HTML-compliant reference tag for each corresponding XML reference object in the text within the HTML document based on context information determined during runtime execution of the XML document.

2. The method of claim 1, wherein the copying step includes copying all the text from the XML document into the new HTML document.

3. The method of claim 1, wherein the resolving step includes providing distinctive namespace declarations for the XML tags having the shared symbols.

4. The method of claim 1, wherein the resolving step includes replacing the shared symbols with respective uniquely identifiable replacement symbols.

5. The method of claim 1, wherein the resolving step includes adding HTML tags within the new HTML document that block out the shared symbols.

6. The method of claim 1, wherein the first inserting step includes:

determining the formatting characteristics of each of the selected XML objects to have a corresponding prescribed Multipurpose Internet Mail Extension (MIME) type; and adding to each of the selected XML objects the corresponding HTML-compliant formatting information based on the corresponding prescribed MIME type.

7. The method of claim 6, wherein the adding step includes adding the corresponding prescribed MIME type to specify a corresponding media type.

8. The method of claim 1, wherein the first inserting step includes inserting for at least one of the selected XML objects a corresponding prescribed HTML tag that specifies the corresponding HTML-compliant formatting information based on the formatting characteristics being at least one of a document type descriptor for the at least one selected XML object, a schema of the at least one selected XML object, and application-specific characteristics generated by the runtime execution of the XML document.

9. The method of claim 1, wherein the second inserting step includes:

identifying the context information for each corresponding XML reference object as having a corresponding location within the executable system; and generating the HTML-compliant reference tag to specify the corresponding location.

10. The method of claim 9, wherein the identifying step includes determining an XML document name and stored location for the corresponding location of the XML reference object.

11. The method of claim 9, wherein the identifying step includes determining for the corresponding location a document name and corresponding stored location of a document that specifies a presence of the XML reference object during the runtime execution.

12. The method of claim 11, wherein the step of determining for the corresponding location a document name includes determining that the document specifies the presence of a callable procedure as the XML reference object.

13. A system configured for executing an application defined by XML documents, the system comprising:

a storage medium for storing the XML documents; and an application server configured for executing the XML documents in an application runtime environment, the application server having a conversion module configured for generating a new hypertext markup language (HTML) document representing a corresponding one of the XML documents by copying text from the one XML document into the new HTML document, adding to the HTML document formatting information for selected XML objects within the one XML document and parsed by the application server within the application runtime environment, and adding to the HTML document an HTML-compliant reference tag for each XML object referenced by the one XML document according to the application runtime environment.

14. The system of claim 13, wherein the conversion module includes a context module configured for generating linking information within the application runtime environment for the HTML-compliant reference tag.

15. The system of claim 14, further comprising a library configured for specifying executable routines accessible by the application server, the context module configured for generating a link to a document that specifies an existence of a selected one of the executable routines based on the corresponding referenced XML object.

16. A computer readable medium having stored thereon sequences of instructions for generating a new hypertext markup language (HTML) document representing an extensible markup language (XML) document, the sequences of instructions including instructions for performing the steps of:

copying into the new HTML document text from the XML document;

resolving shared symbols of XML tags from within the text in the new HTML document;

first inserting into the HTML document HTML-compliant formatting information for selected XML objects within the text of the HTML document based on formatting characteristics determined during runtime execution of the XML document; and second inserting into the HTML document a HTML-compliant reference tag for each corresponding XML reference object in the text within the HTML document based on context information determined during runtime execution of the XML document.

17. The medium of claim 16, wherein the copying step includes copying all the text from the XML document into the new HTML document.

18. The medium of claim 16, wherein the resolving step includes providing distinctive namespace declarations for the XML tags having the shared symbols.

19. The medium of claim 16, wherein the resolving step includes replacing the shared symbols with respective uniquely identifiable replacement symbols.

20. The medium of claim 16, wherein the resolving step includes adding HTML tags within the new HTML document that block out the shared symbols.

21. The medium of claim 16, wherein the first inserting step includes:

determining the formatting characteristics of each of the selected XML objects to have a corresponding prescribed Multipurpose Internet Mail Extension (MIME) type; and adding to each of the selected XML objects the corresponding HTML-compliant formatting information based on the corresponding prescribed MIME type.

22. The medium of claim 21, wherein the adding step includes adding the corresponding prescribed MIME type to specify a corresponding media type.

23. The medium of claim 16, wherein the first inserting step includes inserting for at least one of the selected XML objects a corresponding prescribed HTML tag that specifies the corresponding HTML-compliant formatting information based on the formatting characteristics being at least one of a document type descriptor for the at least one selected XML object, a schema of the at least one selected XML object, and application-specific characteristics generated by the runtime execution of the XML document.

24. The medium of claim 16, wherein the second inserting step includes:

identifying the context information for each corresponding XML reference object as having a corresponding location within the executable system; and generating the HTML-compliant reference tag to specify the corresponding location.

25. The medium of claim 24, wherein the identifying step includes determining an XML document name and stored location for the corresponding location of the XML reference object.

26. The medium of claim 24, wherein the identifying step includes determining for the corresponding location a document name and corresponding stored location of a document that specifies a presence of the XML reference object during the runtime execution.

27. The medium of claim 26, wherein the step of determining for the corresponding location a document name includes determining that the document specifies the presence of a callable procedure as the XML reference object.

* * * * *